(12) United States Patent
Missotten et al.

(10) Patent No.: US 11,659,787 B2
(45) Date of Patent: May 30, 2023

(54) HARVESTING HEAD REEL-CROP ENGAGEMENT

(71) Applicant: CNH Industrial America LLC, New Holland, PA (US)

(72) Inventors: Bart M. A. Missotten, Herent (BE); Jethro Martin, Ephrata, PA (US); Cory Douglas Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 470 days.

(21) Appl. No.: 16/839,268

(22) Filed: Apr. 3, 2020

(65) Prior Publication Data
US 2021/0307248 A1 Oct. 7, 2021

(51) Int. Cl.
*A01D 57/04* (2006.01)
*A01D 41/127* (2006.01)
*A01D 41/14* (2006.01)
*A01D 57/12* (2006.01)
*G01V 8/22* (2006.01)

(52) U.S. Cl.
CPC .......... *A01D 57/04* (2013.01); *A01D 41/127* (2013.01); *A01D 41/141* (2013.01); *A01D 57/12* (2013.01); *G01V 8/22* (2013.01)

(58) Field of Classification Search
CPC .... A01D 41/127; A01D 41/141; A01D 57/04; A01D 41/14
See application file for complete search history.

(56) References Cited

U.S. PATENT DOCUMENTS

| 3,742,689 A | * | 7/1973 | Barows ................. A01D 57/00 56/226 |
| 4,507,910 A | * | 4/1985 | Thornley ............... A01D 57/00 56/DIG. 15 |
| 4,545,261 A | * | 10/1985 | Gebben .................... G01L 3/10 73/769 |
| 4,967,544 A | * | 11/1990 | Ziegler ................ A01D 41/127 56/11.1 |
| 5,591,925 A | * | 1/1997 | Garshelis ............... G01L 3/102 324/207.13 |

(Continued)

FOREIGN PATENT DOCUMENTS

| CN | 101782408 A | 7/2010 |
| CN | 105850349 A | 8/2016 |

(Continued)

OTHER PUBLICATIONS

EPO machine translation of DE 2411153 A1 (original DE document published Sep. 25, 1975) (Year: 1975).*

(Continued)

*Primary Examiner* — David A Testardi
(74) *Attorney, Agent, or Firm* — Peter Zacharias

(57) ABSTRACT

Method, apparatus, and non-transitory computer readable media for detecting reel-crop engagement for a header of a harvester. The header includes a reel configured to draw crop from a crop field toward the header as the harvester moves through the crop field and at least one crop detector mounted to the reel. Data is received from the at least one crop detector mounted on the reel, processed, and used to detect reel-crop engagement.

16 Claims, 6 Drawing Sheets

(56) References Cited

U.S. PATENT DOCUMENTS

| | | | |
|---|---|---|---|
| 6,185,990 B1 * | 2/2001 | Missotten | A01B 79/005 56/10.2 A |
| 6,389,785 B1 * | 5/2002 | Diekhans | A01B 69/008 172/4.5 |
| 9,645,006 B2 | 5/2017 | Phelan et al. | |
| 9,668,419 B2 | 6/2017 | Soldan et al. | |
| 10,829,033 B1 * | 11/2020 | McKinney | B60Q 1/085 |
| 2002/0173893 A1 * | 11/2002 | Blackmore | A01D 41/127 702/155 |
| 2007/0119136 A1 * | 5/2007 | MacGregor | A01D 57/20 56/10.2 H |
| 2015/0195991 A1 | 7/2015 | Ricketts et al. | |
| 2019/0021226 A1 * | 1/2019 | Dima | G01L 3/102 324/207.13 |
| 2019/0110394 A1 | 4/2019 | VanNahmen | |
| 2019/0307070 A1 * | 10/2019 | Dima | A01D 57/04 |
| 2020/0015416 A1 * | 1/2020 | Barther | G06T 7/70 |
| 2021/0055158 A1 * | 2/2021 | Hunt | A01D 41/127 |
| 2021/0137006 A1 * | 5/2021 | Shearer | A01D 57/04 |
| 2021/0153435 A1 * | 5/2021 | Martin | A01D 57/02 |
| 2021/0185877 A1 * | 6/2021 | Hunt | A01D 41/127 |
| 2021/0243954 A1 * | 8/2021 | Honeyman | A01D 57/04 |
| 2022/0346315 A1 * | 11/2022 | Edo | G05D 1/024 |

FOREIGN PATENT DOCUMENTS

| | | | | |
|---|---|---|---|---|
| CN | 107873233 A | | 4/2018 | |
| DE | 2411153 A | * | 9/1975 | ........... A01D 41/127 |
| DE | 2900841 A | * | 7/1980 | ........... A01D 41/141 |
| EP | 1510123 A1 | * | 3/2005 | ........... A01D 41/141 |
| EP | 2681984 A1 | * | 1/2014 | ........... A01D 41/141 |
| EP | 2681984 A1 | | 1/2014 | |
| JP | S61182227 U | * | 11/1986 | ........... A01D 41/127 |
| JP | 05268819 A | * | 10/1993 | ........... A01D 41/141 |
| JP | 06335313 A | * | 12/1994 | ........... A01D 41/141 |
| JP | 08275663 A | * | 10/1996 | |
| JP | 2019024397 A | * | 2/2019 | ............ A01D 57/04 |
| WO | 2019140512 A1 | | 7/2019 | |
| WO | 2019234539 A1 | | 12/2019 | |

OTHER PUBLICATIONS

EPO machine translation of DE 2900841 A1 (original DE document published Jul. 17, 1980) (Year: 1980).*
EPO machine translation of JP 2019-24397 A (original JP document published Feb. 21, 2019) (Year: 2019).*
EPO machine translation of JP 08-275663A (original JP document published Oct. 22, 1996) (Year: 1996).*
Extended European Search Report for EP Application No. 21166840.5 dated Aug. 20, 2021 (seven pages).

* cited by examiner

HARVESTING HEAD REEL-CROP ENGAGEMENT

FIELD OF THE INVENTION

Examples of the present invention relate generally to a header of a plant cutting machine (e.g., a harvester) and, more specifically, to detecting reel-crop engagement using a reel-mounted crop detector (e.g., a photodetector; a photodetector and a reflector; radar, ultrasound, or capacitance) on a plant cutting machine.

BACKGROUND OF THE INVENTION

A plant cutting machine, e.g., an agricultural harvester, such as, but not limited to, a combine or a windrower, generally includes a header operable for severing and collecting plant or crop material ("crop") as the harvester is driven over a crop field.

A reel may be mounted to the header to assist in collecting the crop by lifting the crop and/or pulling the crop toward the header for severing and collecting. The height of the reel with respect to the height of the crop impacts yield. Having the reel too high results in the reel not engaging the crop at all and having the reel too low result in over engagement of the crop, both of which result in lower crop yield.

SUMMARY OF THE INVENTION

A harvesting apparatus that includes a harvester, a header coupled to the harvester, the header including a reel configured to rotate at a reel rotation rate to draw crop from a crop field toward the header as the harvester moves through the crop field, at least one crop engagement detector at least partially positioned on the reel, the at least one crop engagement detector configured to produce data indicating when at least one respective portion of the reel is engaging the crop, and a control system coupled to the at least one crop engagement detector, the control system configured to determine engagement of the crop by the reel from the data and the reel rotation rate.

A method for detecting reel-crop engagement. The method includes receiving data from at least one crop detector mounted on at least a portion of a reel of a harvester, processing the data from the at least one crop detector, and detecting crop engagement from the processed data.

BRIEF DESCRIPTION OF THE DRAWINGS

For the purpose of illustration, there are shown in the drawings examples of the present invention. It should be understood, however, that the invention is not limited to the precise arrangements, dimensions, and instruments shown. Like numerals indicate like elements throughout the drawings. When more than one of the same or similar elements are depicted a common reference number may be used with a letter designation corresponding to respective elements. When the elements are referred to collectively or a non-specific element is referenced, the letter designation may be omitted. In the drawings.

DETAILED DESCRIPTION OF THE INVENTION

Figure 1:
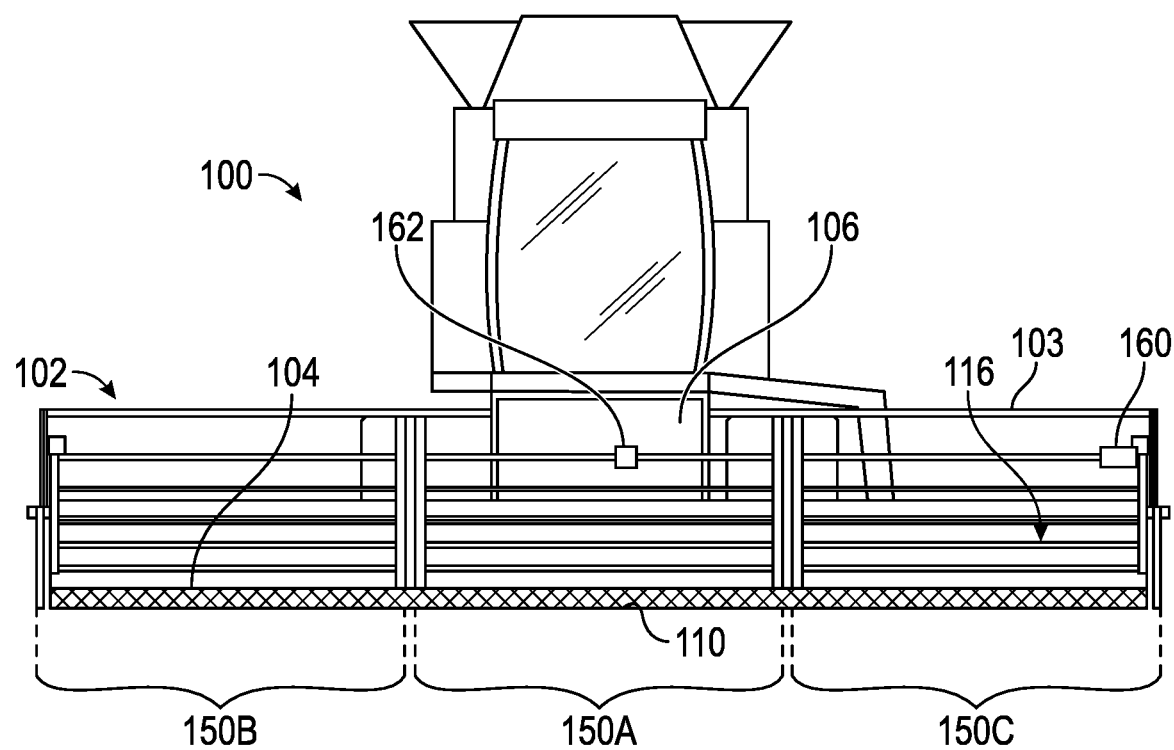
FIG. 1 is a front view of a harvester with attached header including a reel with mounted crop detector in accordance with examples described herein.

Reference is now made in detail to the various examples of the subject disclosure illustrated in the accompanying drawings. Certain terminology is used in the following description for convenience only and is not limiting. Directional terms such as top, bottom, left, right, above, below and diagonal, are used with respect to the accompanying drawings. The term "distal" means away from the center of a body. The term "proximal" means closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "crop" and "crop material" are used throughout the specification for convenience and it should be understood that this term is not intended to be limiting. The header of the subject application is applicable to a variety of crops, including but not limited to wheat, soybeans and small grains.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the signals or light.

The term "about" as used herein when referring to a measurable value such as an amount, a temporal duration, a ratiometric duration (e.g., duty cycle or percentage of time), and the like, is meant to encompass variations of ±20%, ±10%, ±5%, ±1%, or ±0.1% from the specified value, as such variations are appropriate.

The term "substantially" as used herein means considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the examples of the subject disclosure may be combined in any suitable manner in one or more embodiments. One skilled in the relevant art will recognize, in light of the description herein, that the subject disclosure can be practiced without one or more of the specific features or advantages of a particular example. In other instances, additional features and advantages may be recognized in certain embodiments that may not be present in all examples of the present disclosure.

Referring now to the drawings, FIG. 1 illustrates an agricultural harvester 100 in accordance with an example of the present disclosure. For exemplary purposes only, the agricultural harvester is illustrated as a combine harvester. The harvester 100 includes a header 102 attached to a forward end of the harvester 100, which is configured to cut crops, including (without limitation) small grains (e.g., wheat, soybeans, grain, etc.), and to induct the cut crops into a feederhouse 106 as the harvester moves forward over a crop field.

The header 102 is a multi-segment header including a center segment 150A, a right wing segment 150B adjacent a right side of the center segment 150A, and a left wing segment 150C adjacent a left side of the center segment. The center segment 150A is positioned in front of the feederhouse 106 and may be raised/lowered with respect to the harvester 100. The right wing segment 150B and the left wing segment 150C may be raised/lowered to conform to the surface of the crop field. During normal operation, all three segments 150A/150B/150C are engaged in harvesting crop material from the crop field (referred to herein as the "operational state"). In certain situations, such as in an unusually wet/muddy portion of the crop field, the right and/or left wing segments 150B are raised such that they no longer effectively capture crop (referred to herein as a "raised state") in order to prevent the header 102 from getting bogged down in the crop field. Although a three-segment header is illustrated and described, the invention is equally applicable to headers having fewer segments (e.g., a single non-adjustable header, a two-segment header) or more segments.

The header 102 includes a frame 103 having a floor 104 that is supported in desired proximity to the surface of a crop field. The center, right, and left segments 150A, 150B, and 150C extend transversely along a forward edge of the floor 104, i.e., in a widthwise direction of the harvester. The center, right, and left segments 150A, 150B, and 150C are configured to cut crops in preparation for induction into the feederhouse 106. The header 102 may include one or more draper conveyor belts for conveying cut crops to the feederhouse 106, which is configured to convey the cut crops into the harvester for threshing and cleaning as the harvester 100 moves forward over a crop field.

The header 102 includes an elongated, rotatable reel 116 which extends above and in close proximity to the segments 150A, 150B, and 150C. The rotatable reel 116 is configured to cooperate with the one or more draper conveyors in conveying cut crops to the feederhouse 106 for threshing and cleaning. According to an example as shown in FIG. 1, a cutter bar 110 is positioned in front of the segments 150A, 150B, and 150C.

A crop engagement detector including a light emitter and photodetector 160 and a reflector 162 are positioned on the reel 116. The light emitter of the light emitter and photodetector 160 is positioned and configured to produce a beam of light that is directed toward the reflector 162. The reflector 162 is positioned and configured to reflect light it receives to the photodetector of the light emitter and photodetector 160. The photodetector of the light emitter and photodetector 162 is positioned and configured to detect light reflected by the reflector 162. Presence of crop between the light emitter and photodetector 160 and a reflector 162 interferes with the passage of light. Thus, the detection of no light or a level of light below a threshold indicates the portion of the reel containing the light emitter and photodetector 160 and/or the reflector 162 is below the crop canopy. On the other hand, the detection of light or a level of light above a threshold indicates the portion of the reel containing the light emitter and photodetector 160 and the reflector 162 is above the crop canopy.

Although the light emitter and photodetector 160 are illustrated as one component, they may be separate components. Suitable light emitters, photodetectors, and reflectors will be understood by one of skill in the art from the description herein. Additionally, although examples described herein are directed to a crop engagement detector including a light emitter and photodetector 160 and a reflector 162, other types of crop engagement detectors may be used. Such detectors include, by way of non-limiting example, detectors that utilize radar, ultrasound, and/or capacitance to detect the presence/absence of material. Configuring these detectors to detect crop material/crop engagement would be understood by one of skill in the art from the description herein.

Figure 2A:
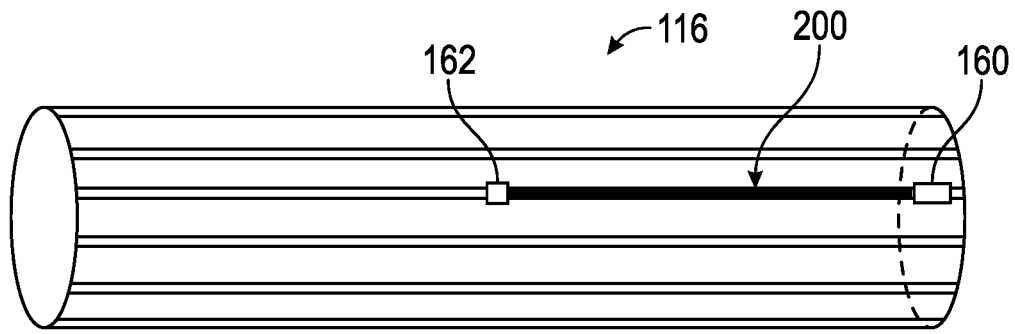
FIGS. 2A, 2B, and 2C are perspective views of three reel-mounted crop detector arrangements in accordance with examples described herein.
Figure 2B:
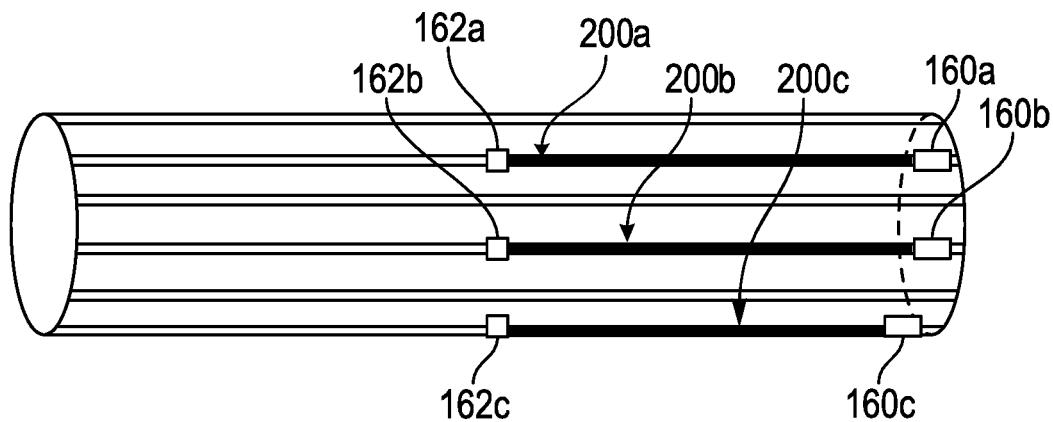

FIGS. 2A and 2B depict a reel 116 of the header 102 with two examples of light emitter, photodetector, and reflector arrangement. Although a single reel 116 is illustrated and described, the invention is applicable to headers having multiple reels (e.g., a reel associated with each segment of a multi-segment header). Additionally, other arrangements will be understood by one of skill in the art from the description herein and are considered within the scope of the present disclosure.

In FIG. 2A, a single light emitter and photodetector 160 and a single reflector 162 are both mounted to the reel 116, e.g., on the same bat. As the reel 116 turns, the light emitter and photodetector 160 and the reflector 162 gather data indicative of whether these components are immersed within the crop (e.g., below the crop canopy) or are above the crop canopy. When the components on the reel 116 are not immersed within the crop, a light beam 200 from the emitter is reflected by the reflector and the reflected light beam is detected by the photodetector, which generates a signal indicating the components are above the crop canopy. When the components are immersed with the crop, the light beam 200 is blocked from being detected by the photodetector, which generates a signal indicating the components are below the crop canopy.

In FIG. 2B, multiple light emitters and photodetectors 160 (light emitters and photodetectors 160a-c) and multiple corresponding reflectors 162 (reflectors 162a-c) are spaced around the reel 116 in a circumferential direction to emit, reflect, and detect respective light beams 200 (light beams 200a, 200b, and 200c). This enables gathering of crop emersion data having finer granularity in time than is available with a single light emitter and photodetector 160 and single reflector 162 since there is less time between sensors potentially being within the crop field. As the reel 116 turns, the light emitter and photodetectors 160 and reflectors 162 gather crop data at each sensor location.

Figure 2C:
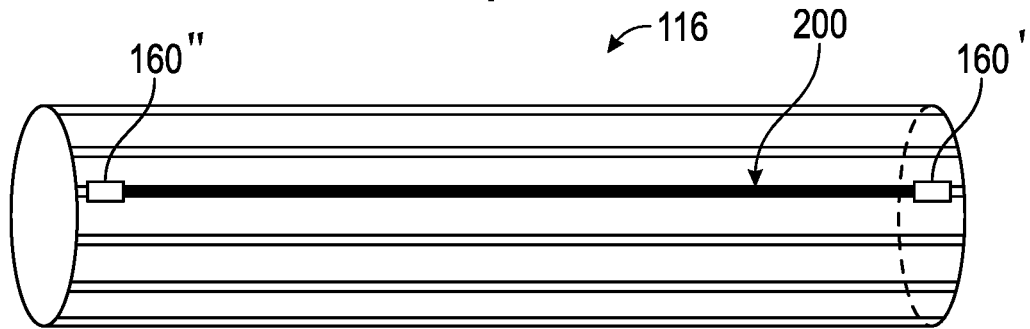

In FIG. 2C, components of the light emitter and photodetector 160 are separated into a light emitter 160' and a photodetector 160". In this embodiment, the light emitter 160' is spaced from the photodetector 160" in a longitudinal direction of the reel 116. By separating the light emitter 160' from the photodetector 160", crop engagement can be detected without the need for a reflector. When the emitter 160' and the photodetector 160" on the reel 116 are not immersed within the crop, a light beam 200 from the emitter is detected by the photodetector, which generates a signal indicating the components are above the crop canopy. When the emitter 160' and the photodetector 160" are immersed with the crop, the light beam 200 is blocked from being detected by the photodetector, which generates a signal indicating the components are below the crop canopy.

Figure 2D:
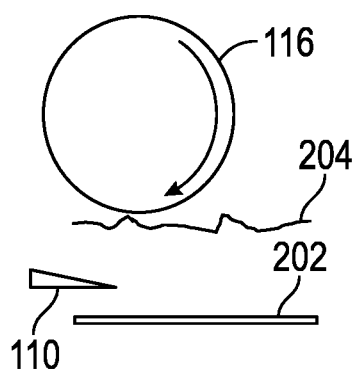
FIGS. 2D, 2E, and 2F are side views of a reel in relation to a crop canopy that is 0% engaged, 25% engaged, and 5% engaged, respectively, in accordance with examples herein.

Movement of the reel 116 on which the light emitter and photodetector 160 and, optionally, the reflector 162 are mounted enables obtaining information about engagement of the reel 116 with the crop. FIG. 2D depicts the reel 116 rotating in a clockwise direction. The reel 116 in FIG. 2D is depicted above the ground 202 and the crop canopy 204. In other words, the reel 116 has zero percent engagement with the crop and, therefore, does not assist with the harvesting operation as the cutter bar 110 severs the crop. When the reel 116 is above the crop canopy 204, there is nothing to interfere with the light passing between the light emitter and photodetector 160 and, optionally, the reflector 162 regardless of the position of the reel 116.

Figure 2E:
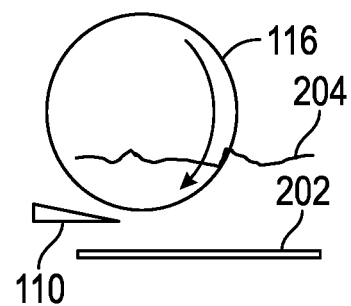

When the reel 116 engages the crop, it pulls the crop toward the header 102. FIG. 2E depicts the reel 116 engaged with the crop approximately 25 percent. When the reel 116 engages the crop canopy 204, the crop within the crop canopy 204 engaged by the reel 116 interferes with the light passing between the light emitter and photodetector 160 and, optionally, the reflector 162 when the portion of the reel 116 containing those elements is below the crop canopy. The percentage of engagement may be calculated based on the amount of time the light is blocked or below a threshold and the rotation rate of the reel 116.

Figure 2F:
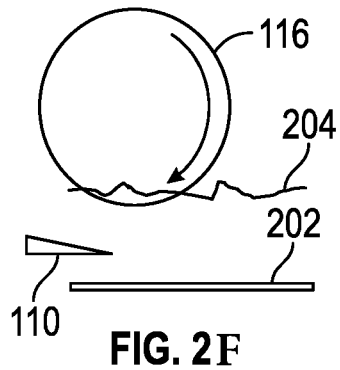

Depending on crop conditions, a crop engagement of 25 percent such as shown in FIG. 2E is likely too much to achieve optimal yields. FIG. 2F depicts a crop engagement of 5 percent, which may be a more optimal crop engagement level depending on crop conditions.

Figure 3:
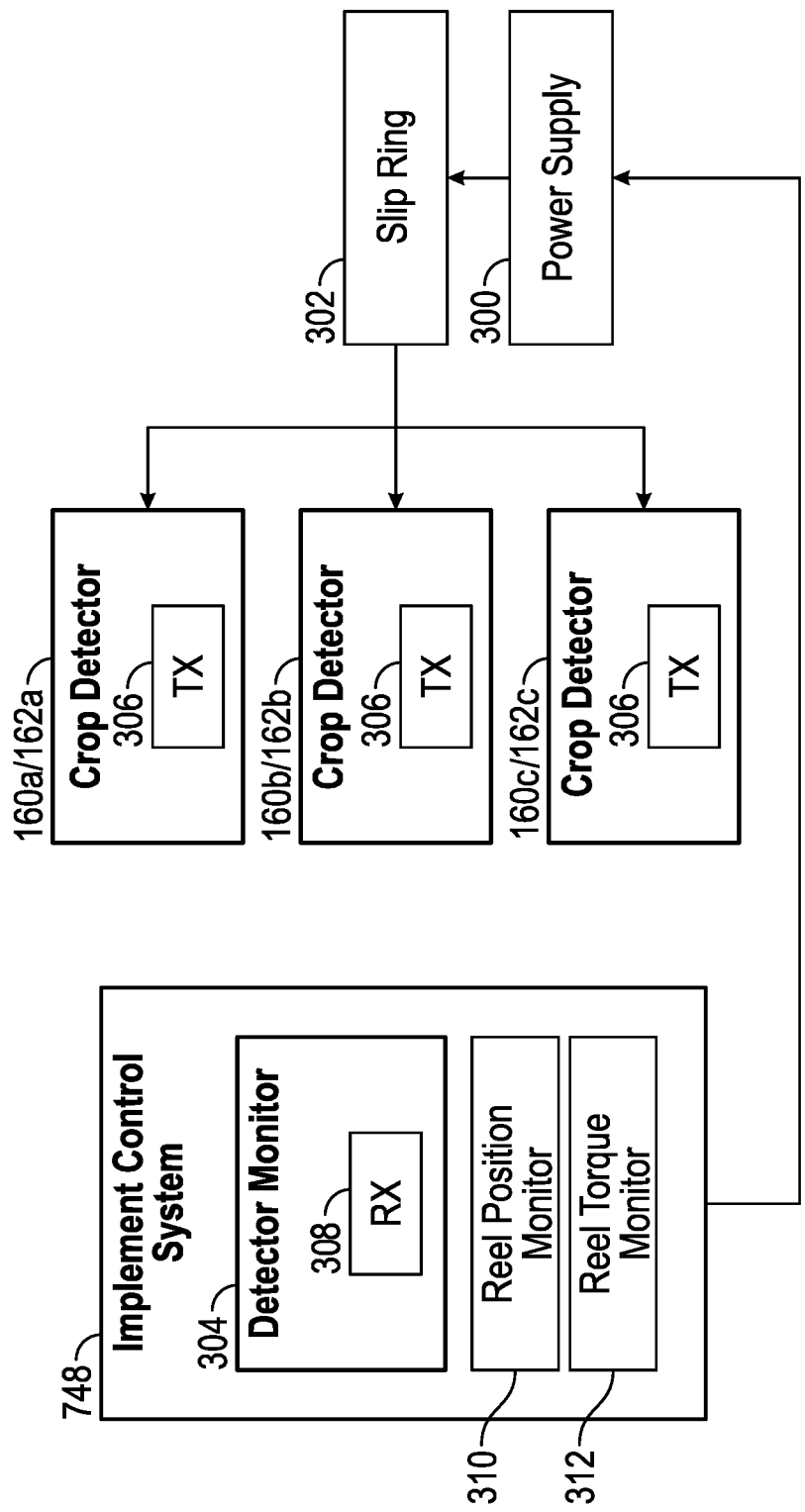
FIG. 3 is a block diagram of a control system in accordance with examples described herein.

FIG. 3 depicts a control system for gathering engagement data using crop detectors, e.g., reel-mounted light emitter and photodetectors 160 (light emitter and photodetectors 160a-c in this example) and reflectors 162 (reflectors 162a-c in this example). A power supply 300 supplies power to the light emitter and photodetectors 160. The power supply 300 may be a power supply of the harvester 100. In one example, the power supply 300 supplies power to the light emitter and photodetectors 160 through a slip ring 302 mounted near an axis of rotation of the reel 116. In other examples, the light emitter and photodetectors 160 may include their own power supply or an adjacent power supply on the emitter, detector, and/or the reel 116 (such as a solar cell that produces power from light, a battery having stored energy, or a kinetic energy source that produces power from the rotation of the light emitter and photodector about the axis of rotation of the reel 116). In examples where the power supply 300 is part of the light emitter and photodetector 160 or is adjacent the light emitter and photodetector 160, the slip ring 302 may be omitted.

In one example, the light emitter and photodetectors 160 include a transmitter 306 for wirelessly transmitting engagement data collected by the light emitter and photodetectors 160. In another example, the engagement data is transmitted through a wired connection (e.g., through the slip ring 302).

An implement control system 748 (see FIG. 7 and related discussion) includes a detector monitor 304 and a reel position monitor 310. The detector monitor 304 monitors engagement data received from the light emitter and photodetectors 160. In an example, the detector monitor 304 includes a receiver 308 for wirelessly receiving engagement data transmitted by the light emitter and photodetectors 160. In another example, the engagement data is received through a wired connection (e.g., through the slip ring 302).

The reel position monitor 310 monitors the orientation of the reel 116 relative to the sensor(s) 160 mounted on the reel to determine orientation of the at least one detector over time. The reel position monitor 310 may monitor an indexing signal generated by the reel 116 that corresponds to the current orientation of the sensor(s). The reel position monitor 310 may then track the position of the reel/sensor(s) as the reel rotates (e.g., based on a rotation rate of the reel 116) for use in determining a level of crop engagement. Crop engagement level versus amount of time in an engaged state (e.g., duty cycle or percentage of time) may be stored in a look-up table in memory accessible to the implement control system 748 for quickly determining crop engagement upon determining how long the crop detector is below the crop canopy at the set rotation rate for the reel 116 (e.g., based on its duty cycle or the percentage of time the signal is blocked in a full reel rotation).

The implement control system 748 additionally includes a reel torque monitor 312. The reel torque monitor 312 is configured to determine the amount of torque being applied to turn the reel at a set rate of rotation. Crop engagement level versus torque level may be stored in one or more look-up tables in memory accessible to the implement control system 748 for quickly determining crop engagement upon determining the amount of torque being applied to the reel 116 to maintain its set rate of rotation. Assuming the reel is running with or overrunning the crop (e.g., reel tip velocity is greater than vehicle speed), more torque being applied to maintain reel rotation indicates a greater level of crop engagement, while less torque indicates less crop engagement. If, on the other hand, the reel is underspeeding (e.g., reel tip velocity is less than vehicle speed) the crop may assist reel rotation, resulting in less torque despite a relatively high level of crop engagement. Different look-up tables may therefore be utilized depending on the relative reel speed.

In one example, when the crop is lodged (e.g., when crop plants bend or break over before being harvested) the reel torque monitor 312 is used to determine crop engagement. In accordance with this example, when the crop is not lodged, the crop detectors 160/162 are used to determine crop engagement. In another example, the crop detectors 160/162 are used to determine crop engagement up to a predefined amount of engagement (e.g., 25 percent) and then the reel torque monitor 312 is used for greater amounts of crop engagement. In yet another example, the crop detectors 160/162 are always used to determine crop engagement without relying on reel torque.

Figure 4:
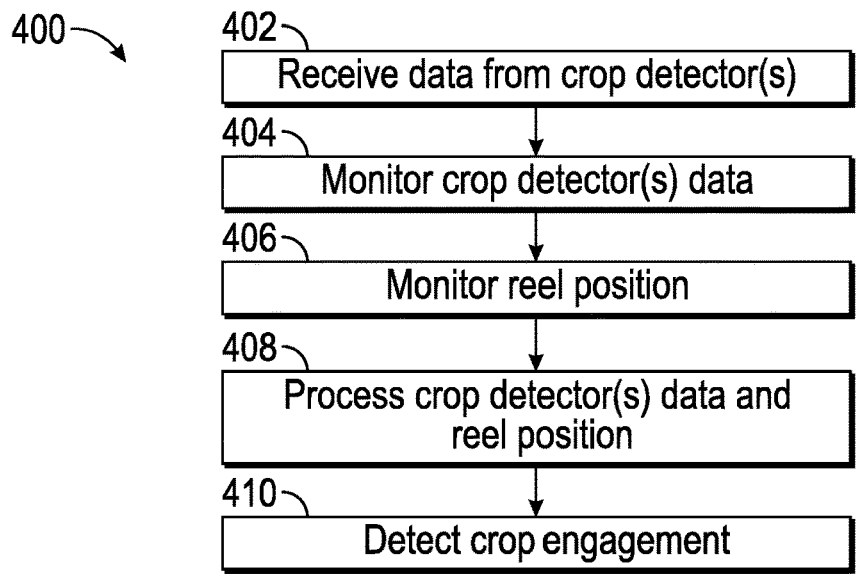
FIGS. 4, 5, and 6 are flow charts for detecting crop engagement, adjusting vehicle operation, and selecting crop engagement detection techniques, respectively, in accordance with examples described herein.
Figure 5:
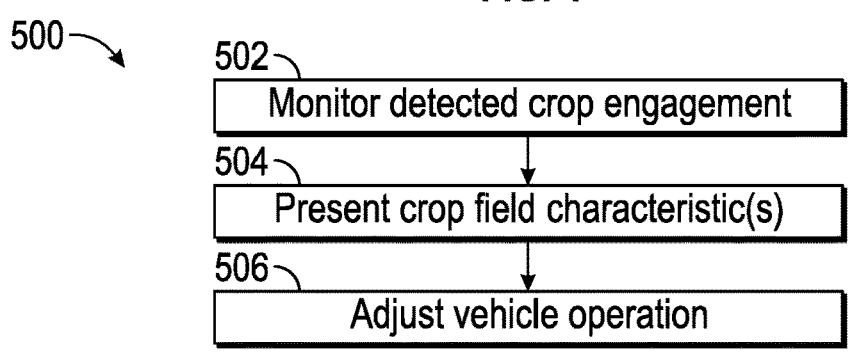
Figure 6:
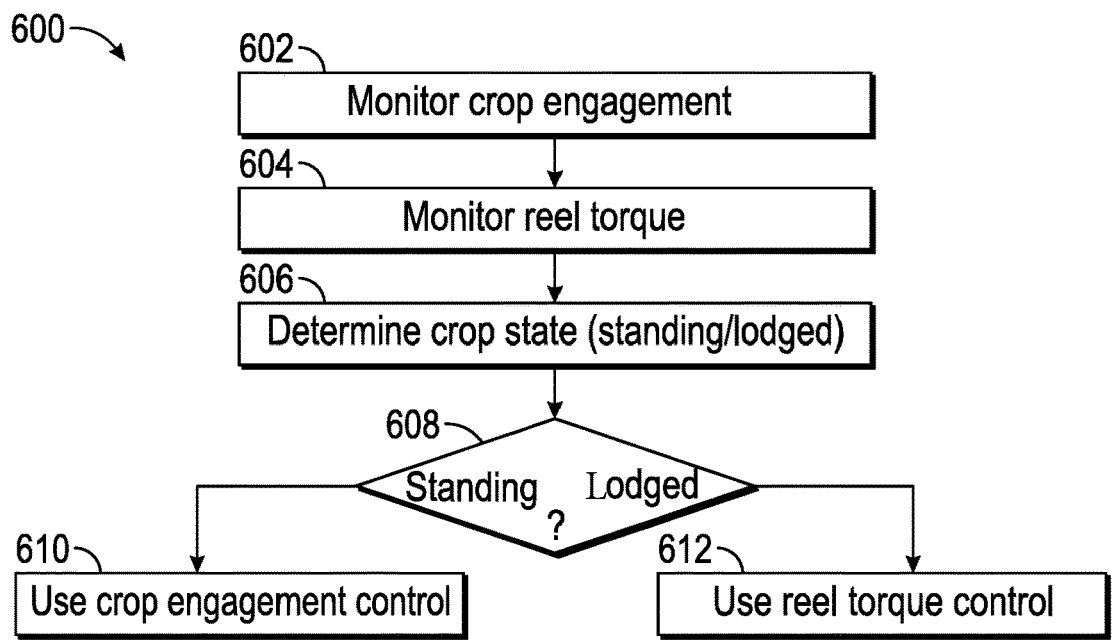

FIGS. 4, 5, and 6 are flow charts for detecting crop field parameters such as crop engagement by a reel, adjusting vehicle operation, and controlling light emitter and photodetectors, respectively. The steps are described with reference to hardware described herein but are not to be limited to such implementations. Although shown as occurring serially, the steps in the blocks of FIGS. 4, 5, and 6 may be reordered or parallelized depending on the implementation. Furthermore, one of skill in the art will understand from the description herein that one or more steps/blocks may be omitted, and one or more additional/alternative steps may be incorporated.

FIG. 4 depicts a flow chart 400 of example steps for detecting crop field data (e.g., engagement of the crop by a reel 116 of a harvester 100 in the crop field). The step in block 402, receives data from crop detector(s) (e.g., one or more light emitter and photodetector 160). The data may include timing data indicating a non-engagement period of time the light emitter and photodetectors 160 are receiving reflected light from reflector 162 and/or an engagement period of time the light emitter and photodetectors 160 are not receiving reflected light from reflector 162. In one example, the light emitter and photodetector 160 transmit data while they are in a particular state (e.g., engaged and/or non-engaged) and the implement control system determines the amount of time they are in a particular state. In another example, the light emitter and photodetector 160 determine how long they are in a particular state (e.g., engaged and/or non-engaged) and transmit the determined time corresponding to that state to the implement control system. Detector monitor 304 of implement control system 748 may receive data from crop detectors via a wireless or a wired connection.

The steps in blocks 404 and 406, monitor crop detector data and reel position, respectively. The implement control system 748 may monitor the light emitter and photodetector data received from the light emitter and photodetectors 160 and the reel position received from the reel position monitor 310. In examples where the light emitter and photodetector 160 transmit data while they are in a particular state, the implement control system 748 monitors the state information and determines the amount of time they are in the particular state. In examples where the light emitter and photodetector 160 transmit a determined time in a particular state to the implement control system 748, the implement control system monitors the amount of time.

The steps in blocks 408 and 410, process the crop detector/reel position data and detect crop engagement, respectively. The implement control system 748 may process the monitored light emitter and photodetector data and the reel position data and use the processed data to detect crop field engagement. In one example, the implement control system 748 determines an amount of time the light emitter and photodetector 160 are engaged with the crop and retrieves a crop engagement level from a look up table corresponding to the set rotation rate of the reel 116.

FIG. 5 depicts a flow chart 500 of example steps for adjusting vehicle operation (e.g., reel height) responsive to crop field parameters (crop engagement) detected based on measurements from a reel-mounted crop detector (e.g., light emitter and photodetector 160). The step in block 502, monitors detected crop engagement (e.g., as detected using the step in block 410 of FIG. 4). Controller 750 of the harvester 100 and/or controller 776 of a base station 774 (see FIG. 7 and related description) may monitor crop engagement detected by implement control system 748.

The step in block 504, presents crop engagement information. Operator interface 752 of harvester 100 and/or operator interface 786 of base station 774 may present crop engagement using, for example, a numerical display or a graphical user interface.

The step in block 506, adjusts vehicle operation (e.g., reel height) based on the level of crop engagement. In one example, reel height is adjusted manually by an operator in the harvester 100 via operation interface 752 or in the base station 774 via operator interface 786. In another example, reel height is adjusted automatically, e.g., by controller 750, responsive to detected crop engagement. For example, controller 750 may lower reel 116 when crop engagement is 3% or less and may raise reel 116 when crop engagement is 7% or more.

FIG. 6 depicts a flow chart 600 of example steps for selecting a crop engagement detection technique for controlling vehicle operation (e.g., reel height) when multiple detection techniques are available (e.g., light emitter/photodetector and reel torque). The step in block 602, monitors crop engagement (e.g., based on reel-mounted light emitter/photodetector 160). The step in block 604, monitors reel torque (e.g., based on readings from reel torque monitor 312).

The step in block 606, determines crop state. In one example, crop state is determined by manual input from an operator in the harvester 100 via operation interface 752 or in the base station 774 via operator interface 786. For example, if the operator observes that the crop is standing, the operator will identify the standing state to the harvester 100. On the other hand, if the operator observes that the crop is lodged, the operator will identify the lodged state to the harvester. In another example, crop state is determined automatically, e.g., based on input from reel torque monitor 312 and/or from the height of the reel and the type of crop. For example, a lodged state may be indicated if the crop is wheat, the reel is relatively low, and crop engagement as determined by the crop detector/reel position monitor is low. In this situation, the harvester determines the crop is lodged. On the other hand, a standing state may be indicated if the crop is wheat, the reel is relatively high, and crop engagement as determined by the crop detector/reel position monitor is high. In this situation, the harvester determines the crop is standing.

If it is determined that the crop is standing, processing proceeds at block 610 with the crop detector/reel position monitor used for crop engagement control. If it is determined that the crop is lodged, processing proceeds at block 612 with the reel torque monitor used for crop engagement control.

Figure 7:
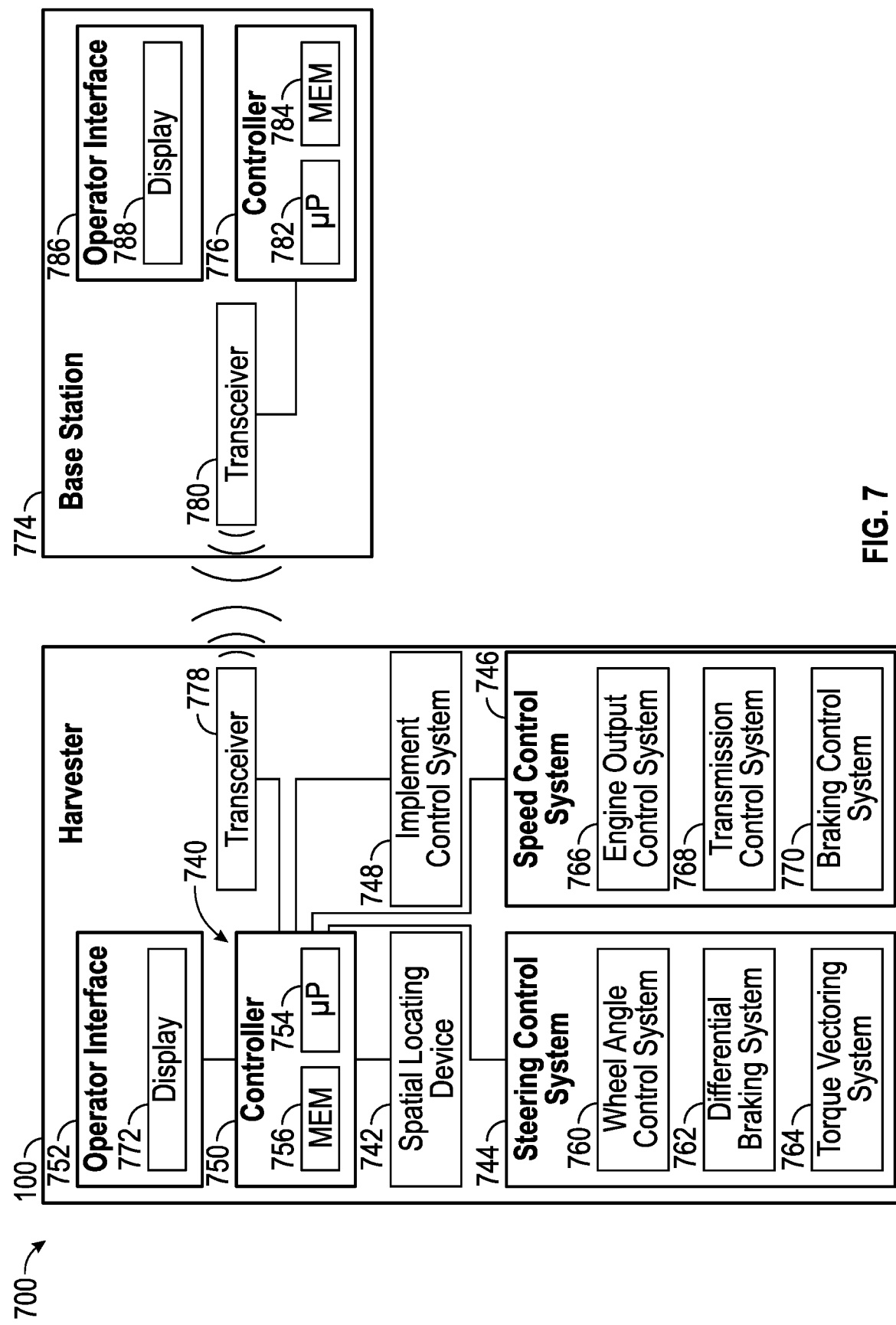
FIG. 7 is a block diagram depicting components for use in implementing apparatus and examples described herein.

FIG. 7 is a schematic diagram of an embodiment of a control system 700 that may be utilized to control the harvester 100, control the header 102 (including reel height), and/or detect crop field parameters (e.g., crop engagement by the reel and whether the crop is in a standing or lodged state by implementing algorithms such as the algorithms depicted and described with reference to FIGS. 4, 5, and 6). In the illustrated example, the control system 700 includes a vehicle control system 740 (e.g., mounted on the harvester 100). In the illustrated embodiment, the harvester 100 includes a spatial locating device 742, which is mounted to the harvester 100 and is configured to determine a position of the harvester 100. The spatial locating device 742 may also be configured to determine a heading and/or a speed of the harvester 100, for example. As will be appreciated, the spatial locating device 742 may include any suitable system configured to determine the position and/or other characteristics of the harvester 100, such as a global positioning system (GPS) or global navigation satellite system (GNSS), for example.

In the illustrated example, the harvester 100 includes a steering control system 744 configured to control a direction of movement of the harvester 100, and a speed control system 746 configured to control a speed of the harvester 100. The illustrated steering control system includes a wheel angle control system 760, a differential braking system 762, and a torque vectoring system 764 that may be used to steer (e.g., adjust the steering angle) the harvester 100. The illustrated speed control system 746 includes an engine output control system 766, a transmission control system 768, and a braking control system 770. In addition, the harvester 100 includes an implement control system 748 configured to control operation of an implement (operational state of the header segments 150) and to determine crop field parameters (such as reel engagement) from, for example, light emitter and photodetectors positioned on the reel 116 of header 102. Furthermore, the control system 740 includes a controller 750 communicatively coupled to the spatial locating device 742, to the steering control system 744, to the speed control system 746, and to the implement control system 748.

In some examples, the controller 750 is an electronic controller having electrical circuitry configured to process data from the spatial locating device 742, among other components of the harvester 100. In the illustrated example, the controller 750 includes a processor, such as the illustrated microprocessor 754, and a memory device 756. The controller 750 may also include one or more storage devices and/or other suitable components. The processor 754 may be used to execute software, such as software for calculating the target position, iteratively calculating virtual paths, controlling the harvester 100, and so forth. Moreover, the processor 754 may include multiple microprocessors, one or more "general-purpose" microprocessors, one or more special-purpose microprocessors, and/or one or more application specific integrated circuits (ASICS), or some combination thereof. For example, the processor 754 may include one or more reduced instruction set (RISC) processors.

The memory device 756 may include a volatile memory, such as random access memory (RAM), and/or a nonvolatile memory, such as ROM. The memory device 756 may store a variety of information and may be used for various purposes. For example, the memory device 56 may store processor-executable instructions (e.g., firmware or software) for the processor 754 to execute, such as instructions for controlling the harvester 100 (e.g., reel height). The storage device (s) (e.g., a nonvolatile/non-transitory storage medium) may include read-only memory (ROM), flash memory, a hard drive, or any other suitable optical, magnetic, or solid-state storage medium, or a combination thereof. The storage device (s) may store data (e.g., field maps, maps of desired paths, vehicle characteristics, etc.), instructions (e.g., software or firmware for calculating crop field parameters such as reel engagement and any other suitable data.

The implement control system 748 is configured to control various parameters of the agricultural implement towed by or integrated within the harvester 100. For example, in certain examples, the implement control system 748 may be configured to instruct an implement controller (e.g., via a communication link, such as a CAN bus or ISOBUS) to adjust a penetration depth of at least one ground engaging tool of the agricultural implement, which may reduce the draft load on the harvester 100. Furthermore, the implement control system 48 may instruct the implement controller to adjust reel height, transition the agricultural implement between a working position and a transport portion, to adjust a flow rate of product from the agricultural implement, to adjust a position of a header of the agricultural implement (e.g., a harvester, etc.), or to adjust which segments of a multi-segment header are operational/non-operational, among other operations.

In the illustrated example, the operator interface 752 may be communicatively coupled to the controller 750. The operator interface 752 is configured to present data from the harvester 100 and/or the agricultural implement to an operator (e.g., data associated with operation of the harvester 100, data associated with operation of the agricultural implement, a position of the harvester 100, a speed of the harvester 100, the desired path, the virtual paths, the target position, the current position, etc.) via a display 772. The operator interface 752 may also be configured to enable an operator to control certain functions of the harvester 100 (e.g., starting and stopping the harvester 100, inputting the desired path, raising/lowering the reel 116 etc.).

It should be appreciated that in certain embodiments, the control system 40 may include a base station 774 having a base station controller 776 located remotely from the harvester 100. For example, in certain embodiments, control functions of the control system may be distributed between the controller 750 of the harvester 100 and the base station controller 776. In some embodiments, the base station controller 776 may perform a substantial portion of the control functions of the control system. For example, in some examples, a first transceiver 778 positioned on the harvester 100 may output signals indicative of vehicle characteristics (e.g., the speed, maximum turning rate, minimum turning radius, steering angle, roll, pitch, rotational rates, acceleration, reel height, or any combination thereof), the position, and/or the heading of the harvester 100 to a second transceiver 780 at the base station 774. The base station control 776 may have a processor 782 and memory device 784 having all or some of the features and/or capabilities of the processor 754 and the memory device 756 discussed above. In some examples, the base station 774 may include an operator interface 786 having a display 788, which may have all or some of the features and/or capabilities of the operator interface 752 and the display 772 discussed above.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A harvesting apparatus comprising:
   a harvester;
   a header coupled to the harvester, the header including a rotatable reel configured to rotate at a reel rotation rate to draw crop from a crop field toward the header as the harvester moves through the crop field;
   at least one crop engagement detector at least partially positioned on the rotatable reel, the at least one crop engagement detector configured to produce data indicating when at least one respective portion of the rotatable reel is engaging the crop, wherein the at least one crop engagement detector includes a light source positioned on the rotatable reel and configured to generate light and a detector positioned on the rotatable reel and configured to detect the light from the light source; and a control system coupled to the at least one crop engagement detector, the control system configured to determine engagement of the crop by the rotatable reel from the data and the reel rotation rate.

2. The apparatus of claim 1, wherein the control system comprises:
a detector monitor configured to receive the data indicating when at least one respective portion of the rotatable reel is engaging the crop from the at least one crop engagement detector; and
a reel position monitor configured to determine the reel rotation rate.

3. The apparatus of claim 2, further comprising:
a reel torque monitor configured to detect torque on the rotatable reel.

4. The apparatus of claim 3, wherein the control system is further configured to:
determine if the crop is in a standing state or a lodged state; and
adjust a height of the rotatable reel:
responsive to the data from the at least one crop engagement detector indicating when the at least one respective portion of the rotatable reel is engaging the crop when the crop is in the standing state; and
responsive to the detected torque when the crop is in the lodged state.

5. The apparatus of claim 1, wherein the control system is further configured to:
adjust a height of the rotatable reel responsive to the data from the at least one crop engagement detector indicating when the at least one respective portion of the rotatable reel is engaging the crop.

6. The apparatus of claim 1, further comprising:
a power source coupled to the header; and
a slip ring assembly coupled to the rotatable reel between the power source and the at least one crop engagement detector.

7. The apparatus of claim 1, wherein the rotatable reel has an axis of rotation and wherein the at least one crop engagement detector comprises a plurality of sensors spaced in a circumferential direction around the axis of rotation.

8. A harvesting apparatus comprising:
a harvester;
a header coupled to the harvester, the header including a rotatable reel configured to rotate at a reel rotation rate to draw crop from a crop field toward the header as the harvester moves through the crop field;
at least one crop engagement detector at least partially positioned on the rotatable reel, the at least one crop engagement detector configured to produce data indicating when at least one respective portion of the rotatable reel is engaging the crop; and
a control system coupled to the at least one crop engagement detector, the control system configured to determine engagement of the crop by the rotatable reel from the data and the reel rotation rate;
wherein each of the at least one crop engagement detector includes:
a light source configured to generate light;
a reflector positioned and configured to reflect the light from the light source; and
a light detector positioned and configured to detect the reflected light, wherein detection of the reflected light indicates no reel-crop engagement and no detection of the reflected light indicates reel-crop engagement, and
wherein the light source, the reflector, and the light detector are positioned on the rotatable reel.

9. A method for detecting reel-crop engagement, the method comprising:
receiving data from at least one crop engagement detector mounted on at least a portion of a rotatable reel of a harvester, wherein the at least one crop engagement detector includes a light source positioned on the rotatable reel and configured to generate light and a detector positioned on the rotatable reel and configured to detect the light from the light source;
processing the data from the at least one crop engagement detector;
detecting crop engagement from the processed data; and
adjusting a height of the rotatable reel responsive to the detected crop engagement.

10. The method of claim 9, wherein the receiving step comprises:
wirelessly receiving the data from the at least one crop engagement detector.

11. The method of claim 9, wherein the processing comprises:
monitoring the data received from the at least one crop engagement detector; and
monitoring rotation rate of the rotatable reel.

12. The method of claim 11, wherein the detecting step comprises:
detecting the crop engagement from the processed data and the rotation rate.

13. The method of claim 9, further comprising:
detecting torque of the rotatable reel.

14. The method of claim 13, further comprising:
determining if the crop is in a standing state or a lodged state; and
adjusting the height of the rotatable reel:
responsive to the data from the at least one crop engagement detector indicating when the at least one respective portion of the rotatable reel is engaging the crop when the crop is in the standing state; and
responsive to the detected torque when the crop is in the lodged state.

15. The method of claim 9, wherein the rotatable reel has an axis of rotation and wherein the at least one crop engagement detector comprises a plurality of sensors spaced in a circumferential direction around the axis of rotation.

16. A non-transitory computer-readable medium storing program code for use with a header of a harvester, the header including a rotatable reel configured to draw crop from a crop field toward the header as the harvester moves through the crop field, the program code, when executed, is operative to cause a computing device to perform the steps of:
receiving data from at least one crop engagement detector mounted on at least a portion of the rotatable reel, wherein the at least one crop engagement detector includes a light source positioned on the rotatable reel and configured to generate light and a detector positioned on the rotatable reel and configured to detect the light from the light source;
processing the data from the at least one crop engagement detector;
detecting crop engagement from the processed data; and
adjusting a height of the rotatable reel responsive to the detected crop engagement.

* * * * *